United States Patent Office 3,535,391
Patented Oct. 20, 1970

3,535,391
STABILIZING COMPOSITIONS
Glendon D. Kyker, Chattanooga, Tenn., assignor to Velsicol Chemical Corporation, Chattanooga, Tenn., a corporation of Tennessee
No Drawing. Continuation-in-part of application Ser. No. 591,445, Nov. 2, 1966. This application Apr. 7, 1969, Ser. No. 814,518
The portion of the term of the patent subsequent to Jan. 9, 1985, has been disclaimed
Int. Cl. C07c 25/00, 25/14
U.S. Cl. 260—651                                                     10 Claims

ABSTRACT OF THE DISCLOSURE

New stabilized aralkyl halide compositions.

---

This application is a continuation in part of my copending application Ser. No. 591,445 filed Nov. 2, 1966 and now abandoned.

This invention relates to the stabilization of aralkyl halides. More particularly, this invention relates to compositions and a process for preventing the deterioration of aralkyl halides through Friedel-Crafts reactions catalyzed by metal contamination.

Aralkyl halides deteriorate in storage and handling due to the effects of various conditions encountered therein. The principal cause of instability of the aralkyl halides is contamination with various metals. This contamination catalyzes Friedel-Crafts type condensations resulting in lowered purity and in some cases complete resinification. The contamination may be due to the presence of the metals themselves, such as iron, nickel, copper, tin, aluminum, antimony, boron, cadmium, manganese, titanium, tungsten and zinc, or to the presence of salts or other compounds of the metals.

The degree of instability of the aralkyl halides varies considerably depending on such factors as the degree of initial purity, the nature of the container and the conditions under which the aralkyl halide has been processed, purified and stored. This lack of stability is a serious problem which results in loss of the compounds themselves and frequently damages to the containers and storage tanks. Among the halides the chlorides in particular tend to decompose under normally encountered storage conditions and are not considered safe for transporting as industrial chemicals in iron drums. The instability problem of these compounds is distinct from the instability problem encountered with the alkyl halides such as carbon tetrachloride where the instability is largely brought about by contamination with moisture. To correct this type of instability, dehydrating agents have been utilized, especially anhydrous salts which react with the water to form stable hydrates. In contrast the present instability problem exists even in the absence of water.

Of particular commercial importance is benzyl chloride. Benzyl chloride is normally prepared by the chlorination of toluene leading to a product having therein a proportion of benzal chloride and benzotrichloride along with the benzyl chloride. This commercial product tends to undergo undesirable condensation or decomposition, or both, in storage and it oftentimes develops a dark color. These objectionable reactions may occur not only during the storage and handling but also during the separation and purification of benzyl chloride or other desired product from the mixture of compounds obtained in the chlorination of toluene.

Heretofore when benzyl chloride has been shipped in iron drums, an aqueous solution of an alkali such as sodium carbonate has been mixed with the benzyl chloride to prevent the above mentioned deterioration. Since the benzyl chloride is frequently used in industrial applications in a water free condition, it was necessary for the user to separate the benzyl chloride from the water or alkali solution. For a customer desiring benzyl chloride free of water, anhydrous benzyl chloride has sometimes been stored and shipped in more expensive containers of glass or silver, such materials being devoid of catalytic activity.

The use of strong acids has also been proposed as stabilizers for aralkyl halides. However, these acids often cause corrosion of the containers and tend to deteriorate the aralkyl halides at high temperatures.

In addition to condensation with itself, aralkyl halides often form condensation products with relatively stable hydrocarbons, particularly in Friedel-Crafts condensations catalyzed by metal contaminates. This reaction is undesirable in the case of aralkyl halides where they are stored or treated in solution with aromatic hydrocarbons. The aromatic hydrocarbons may be inherently present as a result of the preparation of the aralkyl halides. For example, in the preparation of benzyl chloride from toluene, some of the starting material may be retained in solution in the final product. Other aromatic hydrocarbons which may be present and may serve as a co-reactant are benzene, xylene, and the like, as well as their halo- and alkylhalo-substituted compounds.

Thus, there is a present need for a process of stabilizing aralkyl halides and for stabilized aralkyl halide compositions not requiring water, aqueous solutions, strongly alkaline materials or strong acids. Such process and compositions would permit aralkyl halides to be shipped and stored in metallic containers without harmful degradation of the halide or damage to the container.

Therefore it is one object of the present invention to provide stabilized aralkyl halide compositions.

It is another object of the present invention to provide a process for stabilizing aralkyl halides during preparation, purification, storage and use.

Still another object of the present invention is to provide aralkyl halide compositions which are resistant to Friedel-Crafts condensations and polymerization catalyzed by metal contamination.

These and other objects and advantages of the present invention will be readily apparent from the ensuing description and examples.

The stabilizing aralkyl halide compositions of the present invention comprise an aralkyl halide and a compound of the formula

                                                               (I)

wherein M is selected from the group consisting of phosphorus, arsenic, P=O, As=O,

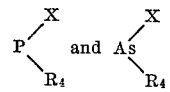

X is selected from the group consisting of chlorine, bromine and iodine; $R_4$ is selected from the group consisting of chlorine, bromine, iodine and Z; and Z, $R_1$, $R_2$ and $R_3$ are independently selected from the group consisting of alkyl and haloalkyl containing from one to ten carbon atoms and

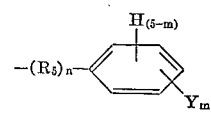

wherein $n$ is an integer from 0 to 1, $R_5$ is an alkylene group containing from one to ten carbon atoms; Y is selected from the group consisting of chlorine, bromine and alkyl and haloalkyl containing from one to ten carbon atoms, and m is an integer from 0 to 5.

The process of the present invention comprises adding to the araykyl halide to be stabilized against Friedel-Crafts reaction catalyzed by metal contamination, an effective stabilizing amount of a compound of structural Formula I. Preferably, an effective amount of the compound described in the paragraph following structural Formula I is utilized.

The compounds of Formula I which are useful to stabilize aralkyl halides in the composition and process of the present invention are exemplified by: trimethylphosphine, trimethylphosphine oxide, trimethylphosphine dichloride, trimethylphosphine dibromide, trimethylphosphine diiodine, tetramethylphosphonium chloride, trimethylarsine, trimethylarsine oxide, tetramethylarsonium iodide, ethyldimethylphosphine, diethylmethylarsine, diethylmethylphosphine, ethyldimethylarsonium iodide, triethylarsine oxide, triethylphosphine, triethylarsine, triethylphosphine oxide, butyldimethylphosphine, butyldimethylarsine, butyldimethylphosphine oxide, trioctylphosphine, trioctylphosphine dichloride, trioctylphosphine oxide, (trifluoromethyl) dimethylphosphine, (trifluoromethyl) dimethylarsine, tris(trifluoromethyl) phosphine, tris(trifluoromethyl) arsine, triphenylphosphine, triphenylarsine, triphenylphosphine oxide, triphenylphosphine dichloride, benzyltriphenylphosphonium chloride, methyltriphenylphosphonium chloride, diphenyltolylphosphine oxide, diphenyltolylarsine, benzyldiphenylphosphine oxide, benzyldiphenylphosphine, dibenzylphenylphosphine, dibenzylphynylphosphine oxide, phenyldi-p-tolylarsine dichloride, tri-p-tolylarsine, tri-p-tolylphosphine, tri-p-tolylphosphine oxide, (o-chlorophenyl)diphenylarsine, (o-bromophenyl) diphenylphosphine, (o-chlorophenyl) diphenylphosphine, tris(p-chlorophenyl) phosphine oxide, (p-bromophenyl)-phenyl-p-tolylarsine, (dibromomethyl) triphenylphosphonium bromide, (p-ethylphenyl)-phenyl-p-tolylarsine, and the like.

The compounds of the Formula I are utilized in the process and composition of the present invention, preferably in an amount effective to stabilize the aralkyl halide against Friedel-Crafts reactions catalyzed by metal contamination. It is preferred to add from about 0.0005% to about 1% and more preferably to add from about 0.0005% to about 0.1% of said compound for each part per million of metal contamination encountered. Generally the addition of from about 0.0001% to about 0.1% of a compound of the Formula I based on the weight of aralkyl halide to be stabilized will be sufficient to provide stabilization under ordinary conditions of storage and handling.

The aralkyl halides with which the process of the present invention is particularly useful are those of the formula

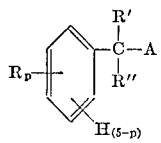

wherein A is chlorine or bromine; R' and R'' are independently selected from the group consisting of hydrogen, chlorine, bromine, alkyl of up to six carbon atoms, chloroalkyl of up to six carbon atoms, bromoalkyl of up to six carbon atoms, aryl of up to 12 carbon atoms, alkyl phenyl of up to nine carbon atoms, chlorophenyl and bromophenyl containing up to five halogen atoms and R is independently selected from the group consisting of chlorine, bromine, iodine, alkyl of up to six carbon atoms, chloroalkyl of up to six carbon atoms, bromoalkyl of up to six carbon atoms, aryl of up to 12 carbon atoms, alkylphenyl of up to nine carbon atoms and chlorophenyl and bromophenyl containing up to five halogen atoms and p is an integer from 0 to 5.

Preferably the aralkyl halides used in the present invention have the formula wherein R' and R'' are independently selected from the group consisting of hydrogen, chlorine and bromine, and R is independently selected from the group consisting of chlorine, bromine, iodine, alkyl of up to six carbon atoms and chloroalkyl of up to six carbon atoms.

The aralkyl halides ar exemplified by the group consisting of
benzyl chloride
2-chlorobenzylchloride
4-chlorobenzylchloride
2,4-dichlorobenzylchloride
2,5-dichlorobenzylchloride
2,6-dichlorobenzylchloride
2,4,6-trichlorobenzylchloride
2,3,6-trichlorobenzylchloride
3,4,5-trichlorobenzylchloride
2,3,4,5-tetrachlorobenzylchloride
2,3,4,6-tetrachlorobenzylchloride
2,3,5,6-tetrachlorobenzylchloride
pentachlorobenzylchloride
o-methylbenzylchloride
p-methylbenzylchloride
2,3-dimethylbenzylchloride
3,4-dihexylbenzylchloride
2,5-dipropylbenzylchloride
2,4,5-tributylbenzylchloride
2,4,6-tripentylbenzylchloride
2,3,4,6-tetramethylbenzylchloride
2,3,5,6-tetraethylbenzylchloride
2,3,4,5-tetramethylbenzylchloride
benzal chloride
o-methylbenzalchloride
p-methylbenzalchloride
m-methylbenzalchloride
2-chlorobenzalchloride
4-chlorobenzalchloride
2,3-dichlorobenzalchloride
3,4-dichlorobenzalchloride
2,4,6-trichlorobenzalchloride
2,3,6-trichlorobenzalchloride
3,4,5-trichlorobenzalchloride
2,3,4,5-tetrachlorozenzalchloride
2,3,4,6-tetrachlorozenzalchloride
2,3,5,6-tetrachlorobenzalchloride
pentachlorobenzalchloride
benzotrichloride
2-chlorobenzotrichloride
4-chlorobenzotrichloride
2,5-dichlorobenzotrichloride
3,4-dichlorobenzotrichloride
2,4,5-trichlorobenzotrichloride
2,3,4-trichlorobenzotrichloride
2,3,4,5-tetrachlorobenzotrichloride
α,α-dichloro-α-bromotoluene
α,α-dibromo-α-chlorotoluene
α-chloro-α-bromotoluene
o-bromobenzylchloride
p-bromobenzylchloride
2,5-dibromobenzylchloride
2,4-dibromobenzylchloride
2,4,5-tribromozbenzylchloride
o-bromobenzalchloride
p-bromobenzalchloride
2,3-dibromobenzalchloride
2,4,5-tribromobenzylchloride
o-bromobenzotrichloride
p-bromobenzotrichloride
2,5-dibromobenzotrichloride
2,4-dibromobenzotrichloride
2,4,5-tribromobenzotrichloride
o-iodobenzylchloride
p-iodobenzylchloride
2,5-diiodobenzylchloride
2,4-diiodobenzylchloride 2,4,5-triiodobenzylchloride
o-iodobenzalchloride
p-iodobenzalchloride
2,5-diiodobenzalchloride
2,3-diiodobenzalchloride
2,4,5-triiodobenzalchloride
o-iodobenzotrichloride
p-iodobenzotrichloride
2,4-diiodobenzotrichloride
2,3-diiodobenzotrichloride
2,4,5-triiodobenzotrichloride
2,4-bis(chloromethyl)toluene
2,5-bis(chloromethyl)toluene
3,6-bis(chloroethyl)toluene
2,6-bis(chlorobutyl)toluene
3,4-bis(chloropropyl)-o-xylene
3,5-bis(chloropentyl)-o-xylene
2,4-bis(chlorohexyl)-m-xylene
2,5-bis(bromomethyl)-m-xylene
4,5-bis(bromoethyl)-m-xylene
2,3-bis(bromopropyl)-p-xylene
2,6-bis(bromopentyl)-p-xylene
1,3-bis(bromohexyl)-2,4,5-trimethylbenzene
1,2-bis(m-chlorophenyl)-3,5,6-trimethylbenzene
1,4-bis(o-bromophenyl)-2,3,5,6-tetramethylbenzene
1,3-bis(3,4-dichlorophenyl)-2,4,5,6-tetramethylbenzene
2-chloromethylbenzalchloride
2-chlorohexylbenzotrichloride
3-phenylbenzalchloride
3-(4-methylphenyl)benzotrichloride
4-propylphenylbenzalchloride
4-ethylphenylbenzotrichloride
benzylbromide
2-chlorobenzylbromide
4-chlorobenzylbromide
2,4-diodobenzylbromide
2,5-dichlorobenzylbromide
2,4,6-triiodobenzylbromide
2,4,5-tribromobenzylbromide
2,3,4-(5-ethylphenyl)benzylbromide
2,3,4,5-tetrachlorobenzylbromide
2,3,4,6-tetrachlorobenzylbromide
pentachlobenzylbomide
benzalbromide
2-chlorobenzalbromide
4-chlorobenzalbromide
2,4-dichlorobenzalbromide
2,5-dichlorobenzalbromide
2,4,5-trichlorobenzalbromide
2,3,4-trichlorobenzalbromide
2,3,5-trichlorobenzalbromide
2,3,4,5-tetrachlorobenzalbromide
benzotribromide
2-chlorobenzotribromide
4-chlorobenzotribromide
2,4-dichlorobenzotribromide
2,5-dichlorobenzotribromide
2,3-dichlorobenzotribromide
3,4-dichlorobenzotribromide
2,4,5-trichlorobenzotribromide
2,3,4-trichlorobenzotribromide
2,3,5-trichlorobenzotribromide
2,3,4,5-tetrachlorobenzotribromide
o-methylbenzylbromide
p-methylbenzylbromide
2,3-dimethylbenzylbromide
3,4-dimethylbenzylbromide
2,5-dimethylbenzylbromide
2,4,5-trimethylbenzylbromide
2,4,6-trimethylbenzylbromide
2,3,4,6-tetramethylbenzylbromide
2,3,5,6-tetramethylbenzylbromide
pentamethylbenzylbromide The compositions and process of the present invention successfully retard and often completely prevent Friedel-Crafts condensations of aralkyl halides with themselves and with aromatic hydrocarbons.

The compositions and process of the present invention for stabilizing arakyl halides will be more clearly understood from the following examples which are presented by way of illustration and are not intended to limit the scope of this invention. In the examples, all percentages of materials are by weight based on the weight of arakyl halide employed, unless indicated otherwise.

EXAMPLE 1

Comparative effectiveness of several materials

Benzyl chloride (2 moles) was heated at reflux for 6 hours with m-xylene (4 moles) and ferric chloride (0.1%). The above reaction was repeated in the presence of each of the following substances:

|  | Percent |
|---|---|
| Triphenyl phosphine | 0.5 |
| Triphenyl amine | 0.5 |
| Triphenyl phospate | 0.5 |
| Tricresyl phosphate | 0.5 |

The progress of the undesired Friedel-Crafts reactions, if any, were measured by weighing the hydrogen chloride evolved. The effectiveness of the various substances in inhibiting the Friedel-Crafts reactions are shown in the table below. Only triphenyl phosphine of the materials tested effectively inhibited the undesirable Friedel-Crafts reactions.

TABLE

| Stabilizer | Time, hrs. | Percent of benzyl chloride reacted |
|---|---|---|
| Triphenyl phosphine | 6 | 0 |
| Triphenyl amine | 6 | 93 |
| Triphenyl phosphate | 6 | 91 |
| Tricresyl phosphate | 6 | 88 |
| None | 1.2 | 99 |

EXAMPLE 2

Stabilization during distillation

Benzyl chloride (252 g.) containing 0.1% ferric chloride (0.25 g.) was treated with 0.5% triphenyl phosphine (1.25 g.) and distilled through a 2-foot glass column at 13 mm. Hg pressure during which the temperature in the pot rose from 65° C. to 190° C. while the overhead vapor temperature remained constant at 65–67° C. The residual oil was light in color and had no hydrogen chloride odor indicating that Fridel-Crafts condensation had not taken place.

EXAMPLE 3

Stablization during chlorination

Benzyl chloride (506 g.) treated with 0.1% anhydrous ferric chloride and 0.5% triphenyl phosphine gave a clear yellow liquid solution. Chlorine gas was bubbled through the liquid solution at 50–60° C. for 6½ hours. Only a negligible trace of hydrogen chloride gas evolved during the chlorination indicating that there was little or no tendency for polymerization of benzyl chloride. Without the triphenyl phosphine extensive polymerization occurs during chlorination.

EXAMPLE 4

Stabilization against polymerization catalyzed by various metals

Separate portions of benzyl chloride (12.65 g.) were treated with one of the following compounds in an amount equal to 4650 p.p.m. of metal in benzyl chloride. This latter quantity refers to the amount of metal whether it was added as free metal or metal halide.

nickel metal (in form of nickel wool)
nickel chloride
stannic chloride
zinc chloride One portion treated with each metal was further treated with triphenyl phosphine (1.5 miles per mole of metal). All of the portions were heated to 145–155° C. for 15 minutes. In the portions without triphenyl phosphine hydrogen chloride gas evolved indicating condensation and polymerization was taking place. In the portions including triphenyl phosphine no evolution of hydrogen chloride gas was observed and the odor of the gas was not detected. The latter indicated that the benzyl chloride was effectively stabilized with triphenyl phosphine against reactions catalyzed by all of the metals tested.

EXAMPLE 5

Stabilization with several stabilizers

Benzyl chloride (12.65 g.) was contaminated with 5 p.p.m. ferric chloride. This solution was divided in 4 equal portions and to each of 3 of the portions was added one of the following in an amount equal to 0.1% by weight: triphenyl phosphine, trioctyl phosphine oxide, and tributyl phosphine. All four portions were heated at 150–170° C. for 15 minutes. The portion which was not stabilized turned dark immediately and evolved hydrogen chloride gas throughout the heating procedure; whereas the 3 treated portions remained clear and did not evolve any gases during the heating procedure.

EXAMPLE 6

Stabilization of benzotrichloride

Benzotrichloride (195.5 g.) was contaminated with 0.1% anhydrous ferric chloride and treated with triphenyl arsine (1.1 mols per mole of ferric chloride). A portion without triphenyl arsine was used as a control. The two solutions were heated to 210–218° C. and the rate of hydrogen chloride gas evolved was measured and calculated as a mole ratio as indicated in the table below. The solution treated with triphenyl arsine was effectively stabilized against Friedel-Crafts condensation.

TABLE

| Stabilizer | Heating time, hrs. | Mole ratio [1] |
|---|---|---|
| Triphenyl arsine | 0.0 | 0 |
| Do | 0.25 | 0.0137 |
| Do | 0.50 | 0.123 |
| None | 0.0 | 0.232 |
| Do | 0.25 | 0.41 |
| Do | 0.50 | 0.452 |

[1] Hydrogen chloride/benzotrichloride.

EXAMPLE 7

Stabilization of benzal chloride

Benzal chloride (2 moles) was treated with anhydrous ferric chloride (0.1%). One-half of this solution was treated with triphenyl phosphine (0.3 g.; 1.15 moles per mole ferric chloride). Both portions of the solution were heated to reflux. The portion treated with triphenyl phosphine was yellow at the reflux temperature and no hydrogen chloride gas was detected. The untreated solution began to release hydrogen chloride gas at 25° C., was black at the reflux temperature and released 0.082 mole of hydrogen chloride per mole of benzal chloride. At the end of one hour of heating the treated solution had not evolved any hydrogen chloride and was lighter in color than the untreated solution while the untreated solution had evolved 0.178 mole of hydrogen chloride per mole of benzal chloride, indicating undesirable Friedel-Crafts reactions had taken place.

From the foregoing description of the invention it will be understood by those skilled in the art that minor alterations and modifications may be made therein. It is intended, therefore that the appended claims include all such modifications and alterations as may fall within the true spirit and scope of the invention.

I claim:

1. A stabilized aralkyl halide composition comprising an aralkyl halide of the formula

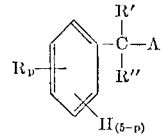

wherein A is chlorine or bromine; R' and R'' are independently selected from the group consisting of hydrogen, chlorine, bromine, and R is independently selected from the group consisting of chlorine, bromine, alkyl of up to six carbon atoms, chloroalkyl of up to six carbon atoms, bromoalkyl of up to six carbon atoms, aryl of up to 12 carbon atoms, alkyl phenyl of up to nine carbon atoms and $p$ is an integer from 0 to 5; and an effective stabilizing amount of a compound of the formula

wherein M is selected from the group consisting of phosphorus, arsenic, P=O,

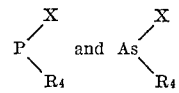

X is chlorine, bromine or iodine; $R_4$ is selected from the group consisting of chlorine, bromine, iodine, and Z; $R_1$, $R_2$, $R_3$ are independently selected from the group consisting of alkyl and haloalkyl containing from one to ten carbon atoms and

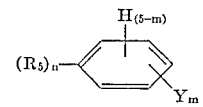

Z is selected from the group consisting of alkyl containing from 1 to 10 carbon atoms and

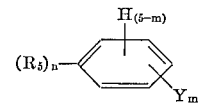

wherein $n$ is an integer from 0 to 1, $R_5$ is an alkylene group containing from one to ten carbon atoms; Y is selected from the group consisting of chlorine, bromine and alkyl containing from one to ten carbon atoms, and $m$ is an integer from 0 to 5.

2. The composition of claim 1 wherein R' and R'' are independently selected from the group consisting of hydrogen, chlorine and bromine, and R is independently selected from the group consisting of chlorine, bromine, alkyl of up to six carbon atoms and chloroalkyl of up to six carbon atoms.

3. The composition of claim 1 wherein the aralkyl halide is selected from the group consisting of benzyl chloride, benzal chloride and benzotrichloride.

4. The composition of claim 1 wherein the aralkyl halide is benzyl chloride.

5. The composition of claim 1 wherein the aralkyl halide is benzal chloride.

6. The composition of claim 1 wherein the aralkyl halide is benzotrichloride.

7. The composition of claim 1 wherein the stabilizing compound is triphenyl phosphine.

8. The composition of claim 3 wherein the stabilizing compound is triphenyl phosphine.

9. The composition of claim 1 wherein the stabilizing compound is triphenyl arsine.

10. The composition of claim 3 wherein the stabilizing compound is triphenyl arsine.

References Cited

UNITED STATES PATENTS

| | | | |
|---|---|---|---|
| 2,803,663 | 8/1957 | Kohn | 260—652.5 XR |
| 2,970,113 | 1/1961 | Bachtel | 260—652.5 XR |
| 2,994,653 | 8/1961 | Miller. | |
| 3,112,348 | 11/1963 | Campbell | 260—652.5 |
| 3,363,013 | 1/1968 | Kyker | 260—651 |

FOREIGN PATENTS 615,186   2/1961   Canada.

HOWARD T. MARS, Primary Examiner

U.S. Cl. X.R.

260—649